No. 836,872. PATENTED NOV. 27, 1906.
H. EKREM.
FENDER.
APPLICATION FILED JULY 5, 1906.
2 SHEETS—SHEET 1.
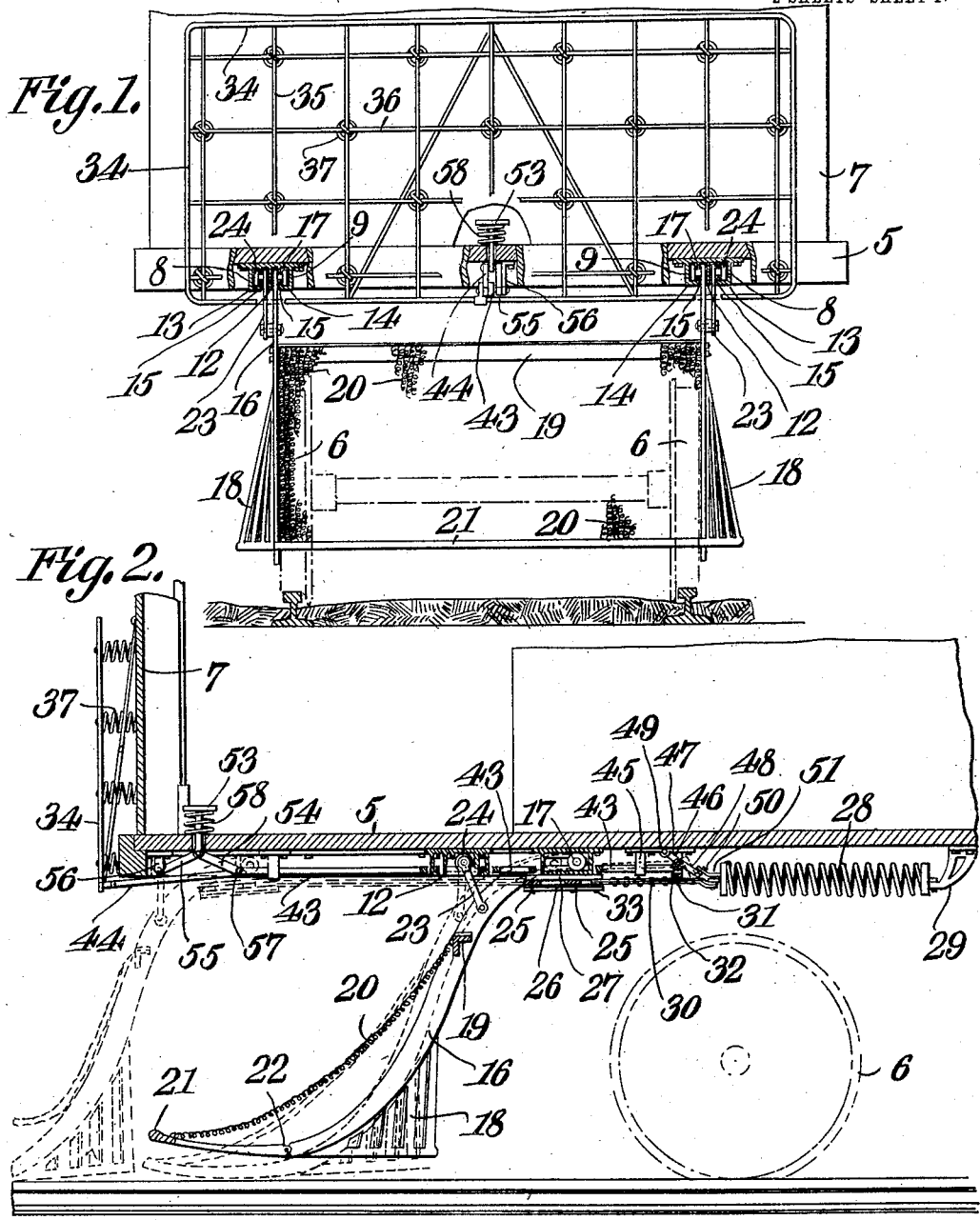
WITNESSES:
Harry Ekrem,
INVENTOR
By C. A. Snow & Co.
ATTORNEYS No. 836,872. PATENTED NOV. 27, 1906.
H. EKREM.
FENDER.
APPLICATION FILED JULY 5, 1906.
2 SHEETS—SHEET 2.
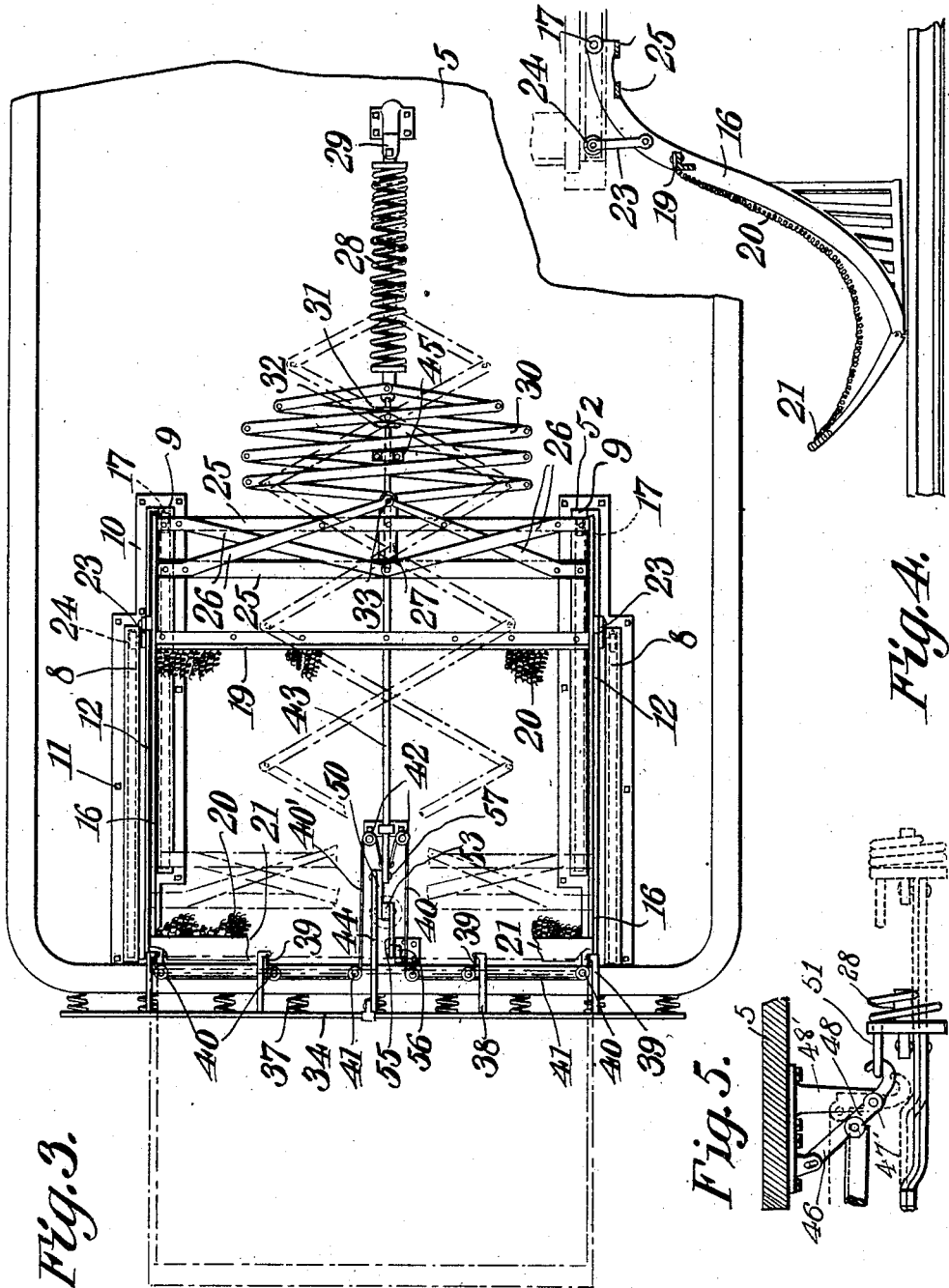
WITNESSES:
Harry Ekrem, INVENTOR.
By C. A. Snow & Co.
ATTORNEYS

UNITED STATES PATENT OFFICE.

HARRY EKREM, OF SAN PEDRO, CALIFORNIA.

FENDER.

No. 836,872.  Specification of Letters Patent.  Patented Nov. 27, 1906.

Application filed July 5, 1906. Serial No. 324,907.

*To all whom it may concern:*

Be it known that I, HARRY EKREM, a citizen of the United States, residing at San Pedro, in the county of Los Angeles and State of California, have invented a new and useful Fender, of which the following is a specification.

This invention relates to fenders for street-cars and other vehicles, and has for its object to provide improved means for supporting the fender in elevated or inoperative position beneath the vehicle and means for automatically projecting the fender to operative position at the front of the vehicle.

A further object is to provide a foot-operated lever for actuating the fender independently of the automatic mechanism, and means for dropping or lowering the free end of the fender when the latter is projected to operative position.

A further object is to provide a system of lazy-tongs levers operatively connected with the fender and normally held in inoperative position by a coil-spring, and further to provide a tripping device for releasing the spring thereby to expand the lazy-tongs and project the fender.

A further object is to provide a fender having a pivoted forward section for attachment to an apron whereby the weight of an object deposited in the fender will depress the apron and elevate the pivoted section, thus preventing the object from being thrown from the fender in the path of the vehicle-wheels.

A still further object of the invention is to generally improve this class of devices so as to increase their utility, durability, and efficiency.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a front elevation of a portion of a car provided with a fender constructed in accordance with my invention. Fig. 2 is a longitudinal sectional view. Fig. 3 is a bottom plan view. Fig. 4 is a detail sectional view of the forward end of the fender. Fig. 5 is a detail side elevation of the trip mechanism.

Similar numerals of reference indicate corresponding parts in all of the figures of the drawings.

The improved device is principally designed for use in connection with street-cars and similar vehicles and by way of illustration is shown applied to a street-car of the ordinary construction, in which 5 designates the platform, 6 the wheels, and 7 the dashboard. Secured to the bottom of the platform on each side of the car are guides 8 and 9, provided with laterally-extending flanges 10, fastened in any suitable manner to the platform, as by bolts or similar fastening devices 11. The guides 9 project a short distance beyond the guides 8, and separating said guides is a vertical web or partition 12, defining longitudinal grooves 13 and 14, the inner face of each groove being partially closed by a longitudinal lip 15.

Suspended from the bottom of the car is a fender consisting of the side bars 16, having their upper ends provided with rollers 17, which fit within the grooves 14 and permit the fender to be moved longitudinally of the car. Depending from the side bars 16 are wheel-guards 18, and connecting said side bars near their upper ends is an angle-bar 19, to which is connected one end of a wire netting or apron 20, the opposite end of which is secured in any suitable manner to the free or active end 21 of the fender. The free end 21 of the fender is pivoted at 22 to the adjacent ends of the arm 16, so that the weight of an object deposited in the apron will depress the latter and tilt the pivoted section upwardly, as best shown in Fig. 4 of the drawings, thus preventing the object from being thrown from the fender in the path of the vehicle-wheels.

The fender is normally supported in elevated or inoperative position by means of links 23, pivoted to the side bars 16 and provided with terminal rollers 24, which bear against the walls of the longitudinal grooves 13. It will here be noted that when the fender is in retracted position the rollers 24 will engage the adjacent end walls of the guides 8, while the rollers 17 will engage the end walls of the guides 9, thus exerting a rearward pull on the links 23 and causing the latter to elevate the free or active end of the fender, as best shown in Fig. 2 of the drawings. Secured to the upper ends of the side bars 16 are transverse bars 25, reinforced by diagonal bars 26, the inner ends of which are operatively connected to a link 27.

Arranged beneath the vehicle is a coil-spring 28, one end of which is secured to a bracket 29, depending from the platform 5, while the opposite end thereof is operatively connected with a system of lazy-tongs, (indicated at 30.) The levers forming the lazy-tongs are pivoted at 31 to a bracket 32, carried by the platform of the car, and are also connected to the free end of the link 27, as indicated at 33.

Secured to the front end of the car is a buffer consisting of a rectangular frame 34, connected by transverse and longitudinal bars 35 and 36, there being a plurality of coil-springs 37 secured at the intersection of the rods 35 and 36 and bearing against the dashboard 7 for yieldably supporting the buffer in spaced relation to said dashboard. Extending laterally from the lower portion of the frame 34 are a plurality of spaced arms 38, each having a cord or other flexible medium 39 secured to the free end thereof and passing over a pulley or roller 40, the cord 39 being operatively connected with a cable 40', which engages suitable rollers 41 and 42 and is fastened in any suitable manner to a rod 43, extending longitudinally of the car beneath the platform of the latter, as best shown in Figs. 2 and 3 of the drawings. One end of the rod 43 is pivotally connected to the lower end of the buffer-frame 34 through the medium of a link 44, while the opposite end thereof extends through the guiding-bracket 45 and is pivoted, as indicated at 46, to a tripping device. The tripping device comprises a pair of levers 47 and 48, the adjacent ends of which are pivoted to the rod at 46, while the lever 47 is pivoted at 49 to one end of the guiding-bracket 45, as shown. The intermediate portion of the lever 48 is pivoted at 47' to a hanger 48', and the free end thereof is provided with a terminal hook 50, adapted to engage a recess in an extension or locking device 51, secured in any suitable manner to one end of the spring 28, thereby to normally hold the spring in extended position. It will thus be seen that the impact of an object against the buffer 34 will, through the medium of the link 44 and cord 40', move the rod 43 longitudinally of the vehicle and break the knuckle or joint 46, thus disengaging the hook 50 from the recess in the extension 51 and causing the spring to expand the lazy-tongs and project the fender to operative position at the forward end of the car, as best shown in Figs. 2 and 5 of the drawings.

The initial forward movement of the fender will cause the links 23 to assume a vertical position, thus allowing the free end of the fender to drop to the dotted-line position shown in Fig. 2, the fender being subsequently forced longitudinally of the car to operative position, as indicated by dotted lines in said figure.

Attention is here called to the fact that the rearward movement of the fender is limited by engagement with the rear walls 52 of the guides 9, while the forward movement of said fender is limited by the forward end walls of the guides 8.

As a means for operating the fender independently of the automatic mechanism there is provided a suitable foot-lever 53, the lower end of which is pivotally connected to a pair of links 54 and 55, the link 55 being pivotally mounted on a bracket 56, while the lever 54 is pivotally connected at 57 to the link 44 and the operating-bar 43, as shown. It will thus be seen that by depressing the lever 53 against the tension of the spring 58 the bar or rod 43 will be moved longitudinally of the car and release the tripping device, thus permitting the spring to project the fender to operative position independently of the buffer and its associated parts.

From the foregoing description it will be seen that there is provided an extremely simple, inexpensive, and efficient device admirably adapted for the attainment of the ends in view.

Having thus described the invention, what is claimed is—

1. The combination with a vehicle, of a fender normally supported in inoperative position beneath the vehicle, a spring operatively connected with the fender, a trip engaging one end of the spring for holding the latter in inoperative position, and means for automatically releasing the trip thereby to project the fender to operative position at one end of the vehicle.

2. The combination with a vehicle, of spaced guides secured to the bottom thereof, a fender normally supported beneath the vehicle and provided with rollers mounted for sliding movement within the guides, means for normally elevating the free end of the fender, and means for automatically lowering the fender and projecting the same to operative position at one end of the vehicle.

3. The combination with a vehicle, of a plurality of sets of spaced guides secured thereto, a fender normally supported beneath the vehicle and provided with rollers seated within one set of guides, links operatively connected with the fender and provided with rollers seated in the adjacent set of guides for normally supporting the forward end of the fender in elevated position, and means for automatically lowering the fender and projecting the same to operative position at one end of the vehicle.

4. The combination with a vehicle, of a fender normally supported beneath the vehicle, a buffer, a spring connected with the fender, a tripping device associated with the spring, and a rod connecting the buffer and tripping device for releasing the latter thereby to project the fender to operative position at one end of the vehicle.

5. The combination with a vehicle, of a fender normally supported in inoperative position beneath the car, a spring, a system of lazy-tongs connecting the fender and spring, a tripping device associated with the spring, and means for automatically releasing the tripping device thereby to project the fender to operative position at the forward end of the vehicle.

6. The combination with a vehicle, of a fender normally supported in inoperative position beneath the vehicle, a spring associated with the fender, a system of lazy-tongs connecting the spring and fender, a tripping device for locking the spring in inoperative position, and means for automatically releasing the tripping device thereby to project the fender to operative position at one end of the vehicle.

7. The combination with a vehicle, of a fender normally supported in inoperative position beneath the vehicle, a spring associated with the fender, a tripping device adapted to engage the spring, means for automatically releasing the tripping device to project the fender to operative position at one end of the vehicle, and means independent of the automatic means for actuating the fender.

8. The combination with a vehicle, of a fender supported beneath the vehicle, a spring associated with the fender, a system of lazy-tongs connecting the spring and fender, a tripping device engaging the spring, a spring-pressed buffer, and a longitudinally-movable rod connecting the buffer and tripping device for releasing the spring thereby to project the fender to operative position at one end of the vehicle.

9. The combination with a vehicle, of a fender supported beneath the vehicle, a spring associated with the fender, a tripping device engaging the spring, a buffer, a rod connecting the buffer and tripping device for releasing the latter thereby to project the fender to operative position at one end of the vehicle, a link connected with the rod, and a foot-operated lever pivotally connected to the link for operating the fender independently of the buffer.

10. The combination with a vehicle, of a fender supported beneath the vehicle, a spring associated with the fender, a buffer supported at one end of the vehicle, a tripping device engaging the spring, a rod extending longitudinally of the car and operatively connected to the tripping device, and a link forming a pivotal connection between the buffer and the rod for releasing the tripping device when the buffer is depressed thereby to project the fender to operative position beneath the buffer.

11. The combination with a vehicle, of a fender supported beneath the vehicle and provided with a hinged forward section, an apron secured to the fender and connected to the hinged portion thereof, and means for automatically projecting the fender to operative position at one end of the vehicle.

12. The combination with a vehicle, of a fender supported in inoperative position beneath the vehicle, means for projecting the fender, a buffer, a tripping device associated with the projecting means, and means connecting the tripping device and buffer for operating the fender-projecting means.

13. The combination with a vehicle, of a fender supported in inoperative position beneath the vehicle, means for projecting the fender to operative position at one end of the car, a tripping device associated with the projecting means, a rod forming a pivotal connection between the buffer and tripping device for releasing the latter thereby to actuate the projecting means, and a foot-operated device for releasing the tripping device independently of the buffer.

14. The combination with a vehicle, of a fender normally supported in inoperative position beneath the vehicle, means for projecting the fender to operative position at one end of the vehicle, a buffer associated with the vehicle, a tripping device for controlling the projecting mechanism, a rod forming a pivotal connection between the tripping device and buffer, cables extending between the buffer and rod, and a foot-operated lever pivotally connected with the rod.

15. The combination with a vehicle, of a fender supported in inoperative position beneath the vehicle, means for projecting the fender to operative position at one end of the vehicle, a buffer associated with the vehicle, a tripping device for controlling the projecting means, a rod forming a pivotal connection between the buffer and tripping device for releasing the latter when the buffer is depressed thereby to actuate the projecting means, a foot-operated lever, and a link forming a pivotal connection between the connecting-rod and foot-operating lever for actuating the fender independently of the buffer.

In testimony that I claim the foregoing as my own I have hereto affixed my signature in the presence of two witnesses.

HARRY EKREM.

Witnesses:
ERWIN WUNDERLICH,
M. CHRISTENSEN.